United States Patent [19]

Slotwinski et al.

[11] Patent Number: 4,824,251

[45] Date of Patent: Apr. 25, 1989

[54] OPTICAL POSITION SENSOR USING COHERENT DETECTION AND POLARIZATION PRESERVING OPTICAL FIBER

[75] Inventors: Anthony R. Slotwinski, Reston; Stephen C. Kenyon, Stafford, both of Va.

[73] Assignee: Digital Signal Corporation, Springfield, Va.

[21] Appl. No.: 101,102

[22] Filed: Sep. 25, 1987

[51] Int. Cl.⁴ .............................................. G01B 9/02
[52] U.S. Cl. .................................... 356/349; 356/4.5; 356/35; 356/358
[58] Field of Search ........................................ 356/4–5, 356/349, 351, 358

[56] References Cited

U.S. PATENT DOCUMENTS 4,652,129 3/1987 Martinelli ...................... 356/351 X
4,714,346 12/1987 Eichen et al. ...................... 356/349

Primary Examiner—Davis L. Willis
Assistant Examiner—Matthew W. Koren
Attorney, Agent, or Firm—Cushman, Darby & Cushman

[57] ABSTRACT

A precision optical distance measuring device utilizes coherent optical detection for extreme precision, and polarization preserving fiber to enable its use in limited access environments. A laser diode provides a linearly polarized source light beam which is directed to a polarizing beam splitter. The source beam passes through the beam splitter and is focused by a lens into a polarization preserving fiber where it travels along one optical axis toward a probe head disposed at the target location. In the probe head, the source beam is focused by a lens onto the target. After focusing, the source beam is passed through a quarter-wave plate. The interface between ambient air and the target-side of the quarter-wave plate reflects a local oscillator beam back through the quarter-wave plate. Meanwhile, the source beam is reflected from the target as a return beam. Mixing of the two beams occurs at the interface and the mixed beam is focused back into the polarization preserving fiber where it is transmitted along a second transmission axis of the fiber. The mixed beam emerges from the fiber and is reflected by the polarizing beam splitter along a second optical axis. The mixed beam is then focused by a detection lens onto a photo detector which coherently detects the mixed beam. The source laser beam is frequency swept so that the photo detector provides an output signal regarding the precise distance between the probe head and the target.

20 Claims, 2 Drawing Sheets

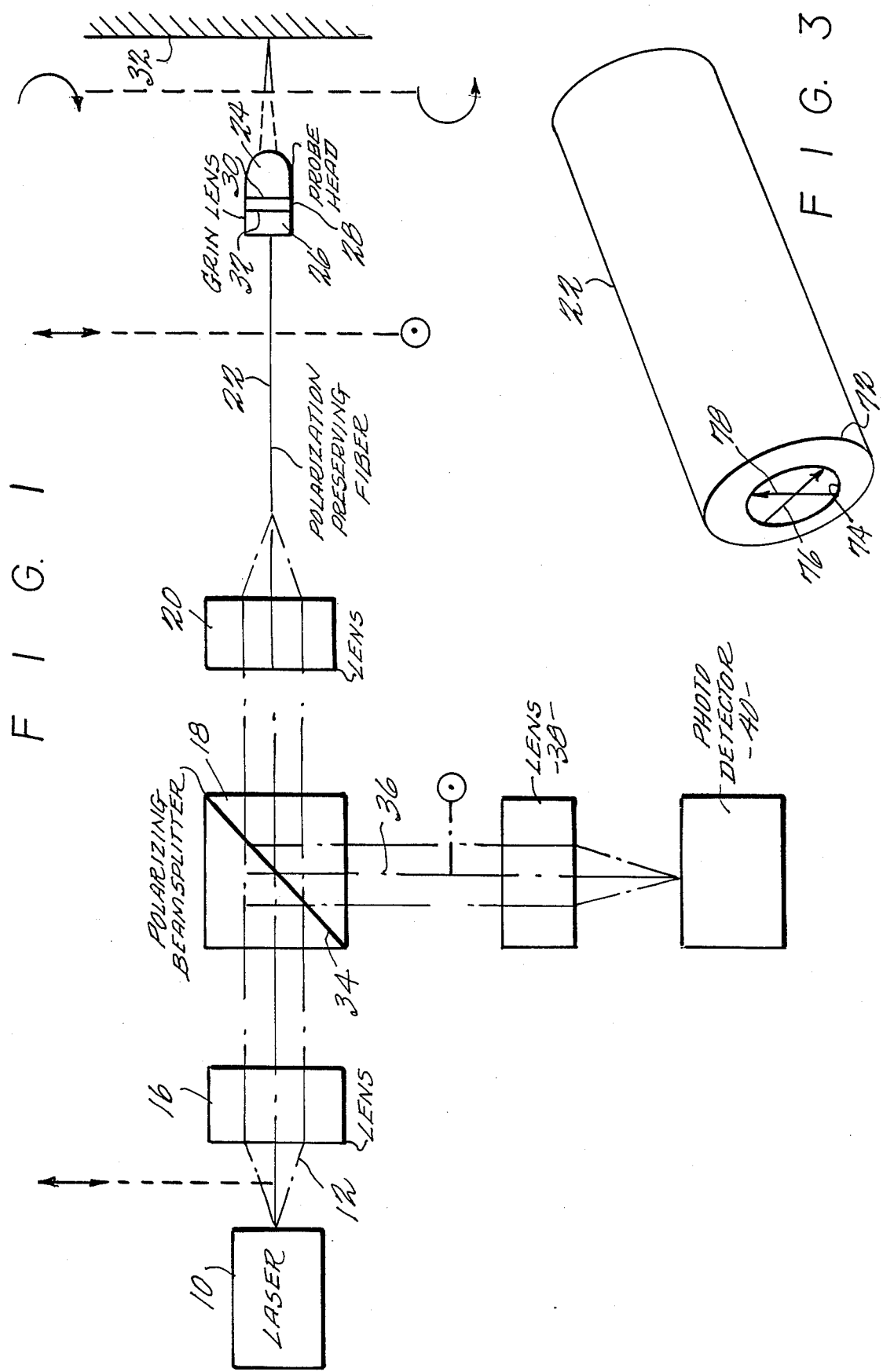

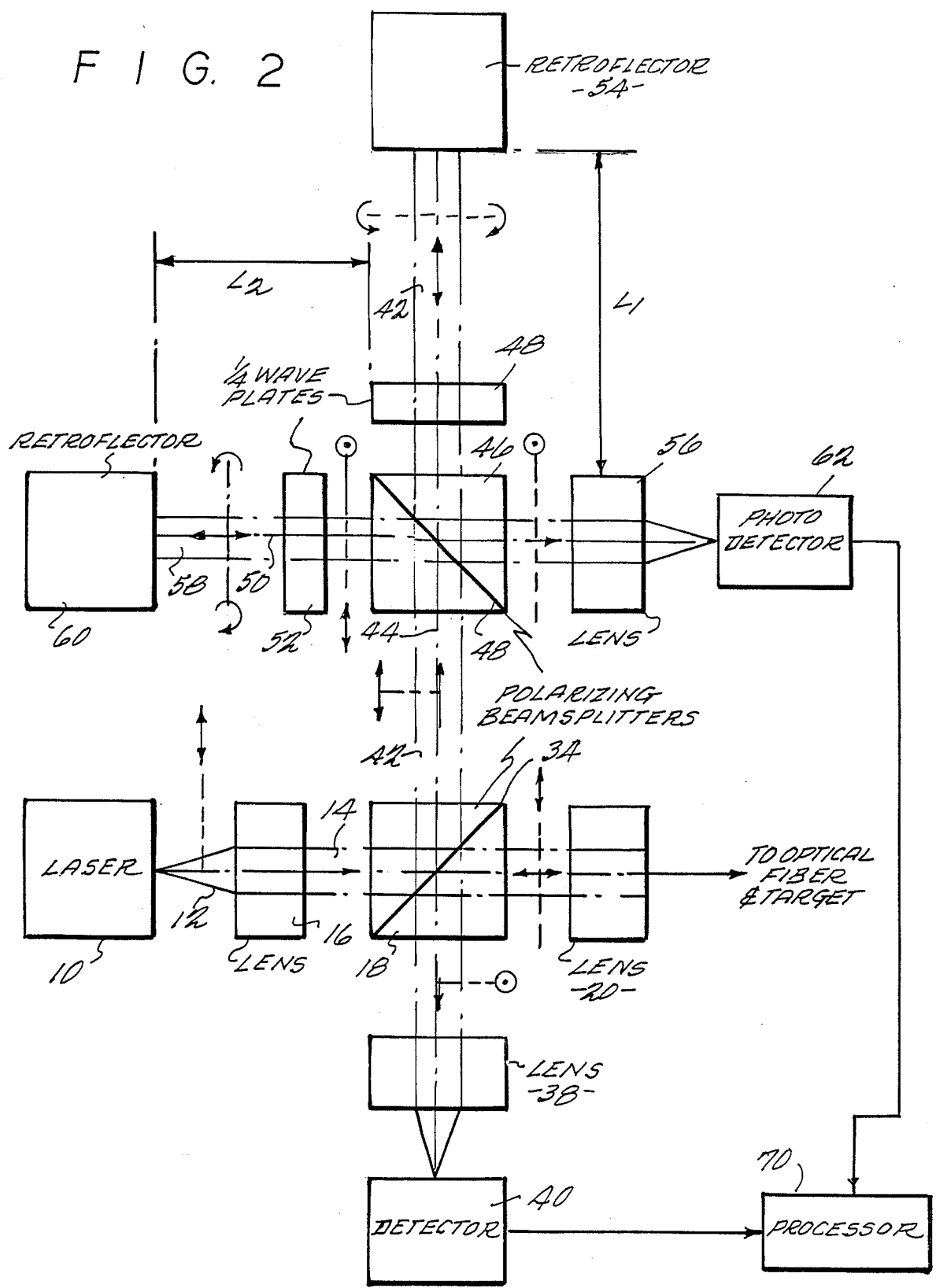

OPTICAL POSITION SENSOR USING COHERENT DETECTION AND POLARIZATION PRESERVING OPTICAL FIBER

BACKGROUND OF THE INVENTION

The present invention relates to the field of optical position/distance measurement systems. More particularly, the present invention is an optical position sensor using coherent (heterodyne) detection and polarization preserving (birefringent) optical fiber. The coherent detection enables high precision accuracy to be obtained, while the polarization preserving fiber enables the system to be utilized in areas of limited access.

Many optical systems exist which measure a distance to a target. Such systems utilize an open beam propagated through free space between the laser source and the target. However, when the target location is such that limited free space is available for beam propagation, such known systems are of limited use. Thus, known systems may be able to perform distance measurements, but the open beam optical sensor head prevents application in limited access areas and tight places. For example, precision measurement of dimensions inside a chassis cannot be accomplished with known open beam systems. While it is known to transfer light through optical cables, precision is compromised due to the environmental effects on the fiber itself. These environmental effects change the optical path length and the polarization of the light in the fiber, adversely affecting measurement precision.

A known optical measurement system is disclosed in U.S. Pat. No. 4,340,304 to Massie. Massie discloses an interferometric method and system for detecting defects in the surface of a mirror. Massie discloses a polarizing beam splitter, a quarter-wave plate, and a target (test mirror). However, Massie is an open beam system and thus incapable of accessing limited space targets. Furthermore, Massie utilizes two laser beams orthogonally polarized with respect to each other. One of the beams is frequency or phase modulated. The beams are heterodyned together, but may not provide the precision capable in coherent systems utilizing a single source light beam.

U.S. Pat. No. 3,771,875 to Russo also teaches an optical interferometer. In Russo, the interferometer has a DC level compensation device. The laser provides a source light beam which is split into a target beam and a reference beam. The target and reference beams also have different polarizations. Thus, the precision available in the Russo device also suffers since the two beams are not in the same spatial mode. Furthermore, Russo is also an open beam system, and thus inapplicable to limited access measurements.

U.S. Pat. No. 4,563,091 to Danliker discloses an open beam system for measuring a position and orientation of a target. However, Danliker fails to suggest coherent optical detection or the use of polarization preserving fiber to gain access to tight places.

Recently, advances in optical technology have enabled the use of coherent (heterodyne) optical detection techniques. Such coherent techniques can provide a 1000 fold increase in the amount of information which can be derived from the light beam reflected from the target. The techniques and advantages of coherent optical detection are generally described in the co-pending U.S. application Ser. No. 590,350 entitled "FREQUENCY MODULATED LASER RADAR", the teachings of which are incorporated herein by reference. Additionally, the article entitled "COHERENT OPTICAL DETECTION; A THOUSAND CALLS ON ONE CIRCUIT" by Link and Henry, IEEE SPECTRUM, February 1987, pp. 52–57 describes the present state of optical heterodyne reception. The teachings of this article are also incorporated into this application by reference.

The advantages of coherent optical detection are fundamental. The information carrying capacity of the optical beam reflected from the target is orders of magnitude greater than other available systems. Simply put, the use of optical heterodyne detection allows for optical radiation detection at the quantum noise level. As such, coherent optical systems provide greater range, accuracy, and reliability than many known prior art measurement systems. This means that rough surfaces and diffuse targets may now be measured. Coherent optical systems can also provide a greater scanning range, a greater working depth of field, and may also operate in ambient light conditions. Furthermore, in a coherent system the target beam is not required to dwell upon the target for very long in order to obtain sufficient information about the characteristics of that target location.

Briefly, optical heterodyne detection provides a source light beam which is directed to a target and reflected therefrom. The return light beam is then mixed with a local oscillator light beam on a photo detector to provide optical interference patterns which may be processed to provide detailed information about the target. Optical heterodyne techniques take advantage of the source and reflected light beam reciprocity. For example, these light beams are substantially the same wavelength and are directed over the same optical axis. This provides an improved signal-to-noise ratio (SNR) and heightened sensitivity. The SNR is sufficiently high so that a small receiving aperture may be used, in contrast to known direct detection systems. A small receiver aperture may be envisioned as a very small lens capable of being inserted into limited access areas. Since a small receiver aperture can still provide detailed information about the target, the optical components of a coherent system may be made very small and provide related increases in scanning speed and accuracy. For example, a coherent optical system using a one half inch aperture can obtain much more information about a target than a four inch aperture used in a direct optical detection system.

The prior art shows that several laser systems have been applied to metrology, and to some extent to gauging. The best known of these is the interferometer which has become a standard for measurement systems. However, the interferometer only measures changes in distance and must be implemented with precisely oriented cooperative reflecting targets. In contrast, the present invention achieves precise measurement of absolute distances of ordinary and rough surfaces. Other prior art laser applications to gauging achieved distance measurements with incoherent detection and triangulation of a laser source and detection system. The accuracy and versatility of such systems are extremely limited.

Key technologies of Al Ga As laser diodes and fiber optical components are currently enjoying a burst of development for applications in telecommunications. Because of these efforts, recent improvements in the quality of injection laser diodes provide the coherence length and wavelength tuning range needed for a precision, coherent optical measurement system. The small size of the injection laser diode and high-technology integrated optical assemblies make possible the development of a new family of small, low cost, precise distance measuring devices which are orders of magnitudes more accurate and more reliable than their more conventional counterparts.

The fundamental concept of coherent optical detection used in the present invention is based on the continuous wave (CW) radar principle. The optical source produces a continuous beam of radiation which is directed at the target. A local oscillator beam is derived from the source light beam and directed to a photo detector. Light reflected from the target is also directed to the photo detector. Since the detector sees energy reflected from the target as well as directly from the source, interference beats are detected as the frequency of the source beam is swept over the interval $\Delta f$. The rate of these beats is a function of the range as well as the magnitude of the frequency interval. This technique allows a tremendous amount of information concerning the target to be derived from the reflected light beam.

One coherent optical detection system is described in U.S. Pat. No. 4,611,912 to Falk et al. Falk et al '912 describes a method and apparatus for optically measuring a distance to and the velocity of a target. In Falk et al, a laser diode provides a linearly polarized, amplitude modulated (with frequency modulated subcarrier) source light beam. The source light beam is directed to a polarization dependent beam splitter which reflects it toward the target. Between the beam splitter and the target is disposed a quarter-wave retardation plate which converts the linearly polarized source light beam to right-hand circularly polarized optical radiation. Between the quarter-wave plate and the target, a local oscillator reflector plate reflects approximately 1% of the source light beam back toward the beam splitter, while allowing approximately 99% of the source light beam to pass toward the target. Light reflected from the target, and light reflected from the local oscillator reflector plate are thereby converted from right-hand circularly polarized optical radiation to left-hand circularly polarized optical radiation. These beams then pass back through the quarter-wave plate and are thereby converted to linearly polarized light beams. These linearly polarized light beams pass through the polarizing beam splitter and are concentrated on a PIN diode by a collecting optical lens. Thus, the local oscillator and the return beam are both linearly polarized in the same direction and are directed along the same optical axis. Thus, the PIN diode detects an optically mixed signal containing the local oscillator beam and the light beam reflected from the target.

However, an extreme disadvantage of the Falk et al '912 system is that very close optical alignment is required between the components. Thus, the laser diode, the beam splitter, the quarter-wave plate, the PIN diode, and especially the local oscillator reflecting plate must be carefully adjusted before usable signals may be obtained. Such close adjustment allows for rapid system degradation with temperature changes and mechanical shocks. Additionally, the Falk et al '912 system is an open beam system and thus incapable of accessing limited areas.

Thus, what is needed is a practical optical precision measurement system capable of great accuracy, rapid measurement time, access to tight spaces, flexibility, and reliability. The present invention proposes such a system.

SUMMARY OF THE INVENTION

The present invention provides an optical measurement system for tight places by using coherent optical detection for precision, and polarization preserving optical fiber to enable coherent detection techniques to be used while allowing access to limited space environments. Furthermore, the use of polarization preserving optical fiber renders the present invention totally immune to environmental effects which would otherwise degrade the signals carried by the source beam and the return beam.

According to the present invention, a coherent optical emitter such as a single mode laser diode provides a source laser beam having a first polarization. A polarizing beam splitter receives the source beam and directs it toward a target. A focusing lens focuses the source beam into the input end of a polarization preserving fiber.

The polarization preserving fiber has first and second transmission axes. The source light beam is carried toward the target along the first transmission axis. The source light beam emerges from the polarization preserving fiber at a probe head disposed at the target location.

In the probe head, a second lens focuses the source light beam onto the target. By focusing the beam on the target, an even greater SNR is obtainable. A quarter-wave plate disposed in the probe head then converts the polarization of the source beam into a second polarization.

The local oscillator beam is derived from the interface between the target-side of the quarter-wave plate and ambient air. Thus, a local oscillator beam is reflected back through the quarter-wave plate, being converted to a fourth polarization. Meanwhile, the source beam is reflected from the target and returns as a return beam having a third polarization. The return beam also passes through the quarter-wave plate, being converted to the fourth polarization.

At the local oscillator interface, the local oscillator beam and the return beam are mixed in the same spatial mode. The mixed beam is then focused into the polarization preserving fiber and transmitted therein, along the second transmission axis, back to the polarizing beam splitter. The polarizing beam splitter then directs the mixed beam toward a photo detector.

A detection lens then focuses the mixed beam on the photo detector which coherently detects the mixed beam. Thus, the output signal of the photo detector contains precise information about the distance between the probe head and the target. This information is extremely precise and immune to environmental effects.

In order to take account of frequency inaccuracies in the source light beam, an alternative embodiment includes a reference channel. The reference channel is used to compensate for said frequency variations. The reference channel utilizes a reference beam split-off from the source light beam at the polarizing beam splitter. The reference beam is directed toward a further polarizing beam splitter.

The further polarizing beam splitter splits-off a further local oscillator beam from the reference beam. Then, the reference beam and the local oscillator beam are respectively directed to two different retroreflectors. The distance to each retroreflector is different but known. After travelling to the retroreflectors, the reference beam and the further local oscillator beam are returned to the further polarizing beam splitter which then mixes these beams and directs them to a further photo detector. The further photo detector thus provides an output signal which contains information regarding a ratio between the distances to the first and second retroreflectors. Where these distances are known, this quantity may be used to more precisely control the output signal from the first photo detector. Thus, variations in frequency in the source laser beam will be compensated for by the reference channel.

BRIEF DESCRIPTION OF THE DRAWINGS

The advantageous structure and functions of the present invention may be more readily understood from the following detailed description of the presently preferred exemplary embodiment when taken together with the attached drawings in which:

FIG. 1 is a schematic diagram showing a first embodiment according to the present invention;

FIG. 2 is a schematic diagram of an alternative embodiment according to the present invention incorporating a reference channel; and FIG. 3 is a schematic depicting polarization preserving optical fiber.

DETAILED DESCRIPTION OF THE PRESENTLY PREFERRED EMBODIMENT

There is a current need for non-contacting, precision measurement of distances to ordinary surfaces using optical techniques. While the FM laser radar disclosed in U.S. Ser. No. 590,350 is able to perform such measurements, the size of the open beam optical sensor head prevents its use in limited access areas and tight places. Utilizing the above-referenced application with a fiber optic cable would enable access to tight spaces, but the precision would be compromised due to the environmental effects on the fiber cable. Such environmental effects change the optical path length of the fiber and the polarization of the light carried in the fiber.

The present invention provides apparatus and technique for using polarization preserving optical fiber together with conventional optical diplexing techniques to develop a version of the FM laser radar which is totally immune to environmental effects.

The operational principal of the FM optical radar is quite simple. A coherent optical emitter such as a single mode diode laser is modulated with an electrical chirp causing the frequency of its output to change linearly with time. Thus, the source light beam is frequency swept. The source light beam is split up into two paths; the local oscillator (LO) path and the signal path. After the source beam is reflected from the target, it is mixed (heterodyned) with the local oscillator beam and interference occurs. The frequency of the changing interference pattern is directly related to the path length differences between the signal path and the LO path according to the following equation:

$$X = \Delta t f c / \Delta f n \quad (1)$$

wherein
 X = the path length difference;
 $\Delta t$ = the time duration of the chirp;
 f = the output (detected) frequency;
 c = the speed of light;
 $\Delta f$ = the change in laser frequency during the time period $\Delta t$; and
 n = the index of refraction of the medium.

In FIG. 1, laser 10 provides a source light beam 12 along an optical axis 14. The source light beam is preferably a frequency swept, single spatial mode beam provided by a laser diode. The source light beam is collimated by collimating lens 16 and directed toward polarizing beam splitter 18.

The source light beam emerges from polarizing beam splitter 18 toward focusing lens 20. Note that the polarizing beam splitter 18 could reflect the source beam in a different direction, using the optical axis 14 as the detection axis. Such obvious alternatives are to be included within the scope of the appended claims.

Focusing lens 20 focuses source light beam 12 into the polarization preserving (high birefringence) fiber 22.

Preferably, the source light beam is linearly polarized, for example, in the horizontal direction. Therefore, the alignment of the source light beam and the polarization preserving fiber 22 is such that the linearly polarized light from the laser is focused into the fiber along one of the primary optical axes of the fiber. Once in fiber 22, the source light beam 12 is immune to changes in polarization due to environmental conditions. By using the fiber, the light can be transported to the target location with great geometric flexibility, while preserving the accuracy of the system.

The linearly polarized source light beam propagates along polarization preserving fiber 22 to probe head 24 disposed at the target location. While FIG. 1 depicts a linear path for fiber 22, it is to be understood that this fiber is flexible and can thus be routed in any geometric pattern to the appropriate target location.

Probe head 24 includes a focusing lens 26, for example, a GRIN rod lens. Lens 26 focuses the source light beam on the target through a quarter-wave plate 28. However, it should be noted that the positions of the quarter-wave plate and the GRIN lens could be reversed in the probe head.

Quarter-wave plate 28 changes the linearly polarized source light beam to circularly polarized radiation, for example, right-hand circularly polarized light.

Local oscillator means 30 is disposed on a target-side of quarter-wave plate 28 to derive the local oscillator beam. According to the preferred embodiment, local oscillator means 30 comprises the interface between quarter-wave plate 28 and the medium through which the measurement is to be taken, for example, ambient air. Part of the light (approximately 4% if the transmission medium is air) is reflected by the interface 30 back into quarter-wave plate 28. This reflected beam then becomes the local oscillator beam.

The circularly polarized source light beam is directed onto target 32 which may be a diffuse target or ordinary surface. Light reflected from the target is returned as a return beam circularly polarized in the opposite direction from the source beam, for example, left-hand circularly polarized radiation. The return beam enters probe head 24 and is directed towards quarter-wave plate 28. Thus, at interface 30 the local oscillator beam and the return beam are heterodyned to form a mixed beam. Since the local oscillator beam is reflected by interface 30, it also possesses right-hand circularly polarized radiation. Thus, the mixed beam is right-hand circularly polarized.

The mixed beam then passes through quarter-wave plate 28 which converts the polarization back to linearly polarization, for example, vertical polarization. The vertically polarized mixed beam is then focused by lens 26 back into the polarization preserving fiber 22.

The mixed beam is thus polarized orthogonal to the source light beam, and is transmitted along polarization preserving fiber 22 along the other principal optical axis of the fiber. The mixed beam returns along the same optical path as the source beam and is also immune to environmental effects. Note that little interference between the source and return beams occurs because of their transmission along different principal axes of the fiber 22.

Upon emerging from polarization preserving fiber 22, the mixed beam is collimated by lens 20 and directed along optical axis 14 to polarizing beam splitter 18. Since the mixed beam is orthogonal in polarization to the source beam, it is reflected from interface 34 and directed along optical axis 36. This not only provides maximum signal to the detector, but also prevents light from returning to the laser which is sensitive to back-reflected light.

The mixed beam is focused by detection lens 38 upon photo detector 40. Photo detector 40 thus detects a heterodyned beam containing interference beats which are proportional to the distance between probe head 24 and target 32. The output signal of photo detector 40 thus contains precise values regarding the distance to the target.

Probe head 24, being composed of miniature optical components, can be used in places where there is very little room for a conventional sensor. To prevent unwanted reflections at component interfaces, probe head 24 can be constructed using index matching epoxy 32 between polarization preserving fiber 22 and lens 26, and between lens 26 and quarter-wave plate 28. Alternatively, probe head 24 may be constructed by assembling lens 26 and quarter-wave plate 28 at appropriate angles, or a combination of angular adjustments and optical epoxy.

Since the actual interference occurs at the target-side of quarter-wave plate 28, the path length difference between the local oscillator and signal paths is the same as the distance to be measured. Thus, optical path length changes in the fiber effect both LO and signal paths equally, and will have no effect on the output. Finally, since at the point of interference, the two optical paths are in the same polarization state, the mixing efficiency is maximized.

FIG. 2 depicts an embodiment used for precision measurements to compensate for frequency deviations in the frequency of the source light beam. This is done quite easily by using a small amount of the laser light that is reflected by the polarizing beam splitter 18 to form a ratio of path lengths which will also vary in accordance with such frequency deviations. These frequency deviations will then be taken into account by a processor which receives signals from the reference arm and the target arm.

A reference beam 42 is split-off from source light beam 12 at the interface 34 of polarizing beam splitter 18. Reference beam 42 is directed along optical axis 44 toward a further polarizing beam splitter 46.

Interface 48 of polarizing beam splitter 46 passes most light along optical axis 44 toward the quarter-wave plate 48. This is the reference arm. However, a small portion of light is reflected at interface 48 and directed along optical axis 50 toward quarter-wave plate 52. This is the local oscillator arm.

In the reference channel, the linearly polarized reference beam propagates along axis 44 to quarter-wave plate 48. Quarter-wave plate 48 converts reference beam 42 to circularly polarized radiation, for example, left-hand circularly polarized light. This light impacts retroreflector 54 and is reflected therefrom along optical axis 44. The reflected reference beam is converted to opposite circularly polarized light, for example, right-hand circularly polarized radiation. The return reference beam passes back through quarter-wave plate 48 which converts it into linearly polarized light, for example, vertical polarization. The vertically polarized reference beam is then reflected from interface 48 of polarizing beam splitter 46 toward detection lens 56.

Meanwhile, local oscillator beam 58 reflected from interface 48 is directed along optical axis 50 to quarter-wave plate 52. Quarter-wave plate 52 converts the linearly polarized light to circularly polarized light, for example, to right-hand circular polarization. The circularly polarized local oscillator beam is then reflected by retroreflector 60 and directed back along optical axis 50 as oppositely circularly polarized light, for example, left-hand circular polarization. The reflected local oscillator beam passes back through quarter wave plate 52 where it is converted to linear polarization, for example, vertically polarized light. This light then enters polarizing beam splitter 46 where it mixes with the return reference beam at interface 48. Since both the local oscillator and reference beam are linearly polarized in the same direction, the mixing efficiency on interface 48 is greatly enhanced.

The mixed reference beam is now directed along optical axis 50 toward detection lens 56 which focuses the mixed beam on photo detector 62. Photo detector 62 thus provides an output signal corresponding to the distances between beam splitter 46 and retroreflectors 54 and 60.

The optical path length between polarizing beam splitter 46 and retroreflector 54 is designated as $L_1$. Likewise, the optical path length between polarizing beam splitter 46 and retroreflector 60 is designated by $L_2$. These path lengths should be different. Thus, detector 62 outputs a signal which corresponds to a ratio of the distances L1, L2. Since these path lengths will not change, any variation in the output signal from detector 62 may be attributed to frequency changes in the source light beam 12.

The output signal from detector 62 is provided to processor 70, along with the output signal from detector 40 (which contains information regarding the distance to the target). Processor 70 can thus use the output from detector 62 to eliminate any frequency variations in the output signal from detector 40 according to any convenient calculation such as the formula: $D=(N_t/N_r)(L_2-L_1)$, where D is the distance between probe head 24 and target 32, $N_t$ is the number of interference fringes counted by photodetector 40, and $N_r$ is the number of interference fringes counted by photodetector 62. In such a fashion, an extremely precise signal is provided which contains only information regarding the distance between the local oscillator interface 30 and target 32.

In FIG. 3, polarization preserving fiber 22 is shown as having a cladding 72 and a core 74. In FIG. 3, the relative dimensions of cladding 72 and core 74 are not to scale.

Polarization preserving fiber is a high birefringence fiber. Fiber 22 exhibits different indices of refraction for orthogonally linear polarizations of source light beam 12. The phase velocity of a wave in the birefringent fiber 22 thus depends on the polarization of the wave.

Fiber 22 has major optical axes 76 and 78, generally orthogonal to one another. Source light beam 12 will, for example, propagate along fiber 22 along first axis 76, while the mixed return beam will propagate back through fiber 22 along transmission axis 78. Thus, both linearly polarized light beams are relatively immune to environmental conditions imposed on the optical fiber. This enables probe head 24 to be placed in environmentally noisy environments. The configuration described also ensures that the signal to the photo diode 40 is maximized under all conditions.

Thus, what has been described is a precision detection system which uses coherent optical detection for extreme accuracy, and polarization preserving fiber to protect the source beam and the mixed return beam from adverse environmental effects. Such a system is capable of small scale integration, mass production techniques, and is very reliable in use.

While the present invention has been described according to the preferred embodiments, those of skill in this field will readily perceive a number of alternative constructions. For example, polarizing beam splitters 18 and 46 may be replaced by star couplers, cleaved fibers, and other known means for splitting and directing laser beams. In addition, the retroreflectors may be replaced by a known means of accurately reflecting a laser beam back along its optical axis. Furthermore, while a laser diode is the preferred embodiment of laser 10, other known laser systems may be applicable, depending on a particular application for this device.

In addition, a PIN detector is preferred for photo detectors 40 and 62. However, the photo detectors may comprise photo conductors, PN photo detectors, avalanche photo detectors, photo multipliers, resonant optical cavity detectors, pyroelectrical detectors, and other known means for detecting a laser beam. Currently, the PIN detector is preferred because of its heightened sensitivity.

Likewise, those of skill in this field will recognize that the various polarization manipulations in this invention may be alternatively arranged. For example, the source light beam may be horizontally or vertically polarized light. Likewise, the polarizing beam splitters may have interfaces arranged at 90° from those depicted in the figures. This would provide a modified scheme for the various local oscillator, reference, source, and mixed beams. All such alternative embodiments are to be included within the scope of the appended claims.

Thus, what has been described is a precise measurement system using coherent optical detection and polarization preserving fiber. While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. The scope of the appended claims is to be accorded the broadest interpretation so as to encompass all such modifications and equivalent structures.

What we claim is:

1. Optical distance measuring apparatus, comprising:
    laser source means for providing a source laser beam having a first polarization;
    beam splitter means, for receiving and said source beam and directing it along a first optical axis;
    first lens means for receiving said source beam from said beam splitter means and focusing it;
    polarization preserving fiber means, having first and second transmission axes and first and second ends, for receiving the focused source beam from said first lens means at said first end and transmitting it to said second end along said first transmission axis;
    a probe head disposed at a target location and coupled to said fiber means second end;
    second lens means, disposed in said probe head, for focusing the source light beam emerging from said fiber second end on a target;
    quarter wave means, disposed in said probe head, for converting the polarization of said first polarization source beam into a second polarization source beam;
    local oscillation means, disposed in said probe head for deriving a local oscillator beam having a third polarization from said second polarization source beam, an for mixing said third polarization local oscillator beam with a return beam reflected from a target and having said third polarization to form a mixed beam;
    said quarter wave means converting the third polarization mixed beam into a fourth polarization mixed beam;
    said polarization preserving optical fiber means transmitting said mixed beam from said second end to said first end along said second transmission axis;
    said first lens means directing said mixed beam from said fiber means second end to said beam splitter means;
    said beam splitter means directing said mixed beam along a second optical axis;
    third lens means for receiving said mixed beam from said beam splitter means and focusing it;
    detector means for optical heterodyne detecting said mixed beam, and for providing an output signal indicative of a distance between said probe head and said target.

2. Apparatus according to claim 1 further including fourth lens means disposed between said laser diode means and said beam splitter means, for collimating said source beam.

3. Apparatus according to claim 1 wherein said local oscillator means comprises an ambient air-quarter wave means interface on a target side of said quarter wave means.

4. Apparatus according to claim 1 wherein said second lens means comprises a GRIN lens disposed between said fiber means second end and said quarter wave means.

5. Apparatus according to claim 1 wherein said beam splitter means comprises a polarization dependent beam splitter.

6. Apparatus according to claim 1 wherein said laser source means comprises a laser diode generating a single optical mode, continuous wave, frequency swept source beam.

7. Apparatus according to claim 1 wherein said beam splitter means splits a first polarization reference beam from said source beam, and further including reference channel means for receiving said reference beam, and for compensating for frequency shifts of said source beam provided by said laser source means.

8. Apparatus according to claim 7 wherein said reference channel means comprises:

further beam splitter means for receiving said reference beam and directing it along a third optical axis, and for splitting off a further local oscillator beam, having said first polarization, from said reference beam and directing it along a fourth optical axis;

further quarter wave means disposed along said third optical axis, for converting said first polarization reference beam into a second polarization reference beam;

first retroreflector means disposed along said third optical axis a distance $L_1$ from said further beam splitter means, for reflecting said second polarization reference beam back along said third optical axis as a third polarization reference beam;

said further quarter wave means converting the third polarization reference beam into a fourth polarization reference beam;

additional quarter wave means, disposed along said fourth optical axis for converting said first polarization further local oscillator beam into a second polarization further local oscillator beam;

second retroreflector means disposed along said fourth optical axis at a distance $L_2$ from said further beam splitter means, for reflecting said second polarization further local oscillator beam;

said additional quarter wave means converting the third polarization further local oscillator beam into a fourth polarization further local oscillator beam;

said further beam splitter means mixing said fourth polarization reference and further local oscillator beams to provide a reference mixed beam;

reference lens means for focusing said reference mixed beam; and reference detector means for optical heterodyne detection of reference mixed beam.

9. Apparatus according to claim 8 further including processing means, coupled to said detector means and said reference detector means for calculating said distance between said probe head and said target.

10. Apparatus according to claim 9 wherein said detector means counts a number $N_t$ of fringes in said mixed beam, and wherein said reference detector means counts a number $N_r$ of fringes in said reference mixed beam, and wherein said processing means includes means for calculating said distances D according to the formula:

$$D=(N_t/N_r)(L_2-L_1).$$

11. Optical measurement apparatus, comprising;

laser diode means for providing a substantially single mode source laser beam;

first lens means for collimating said source beam;

polarizing beam splitter means for directing the collimated beam along a first optical axis;

second lens means, disposed along said optical axis, for focusing the directed source beam;

polarization preserving optical fiber means for receiving the focused source beam and transmitting it to a target location;

third lens means, disposed at said target location, for receiving the transmitted source beam from said polarization preserving fiber means and focusing it on a target disposed at said target location;

quarter - wave means, disposed at said target location, for converting a polarization of said source beam;

local oscillator means, disposed at said target location, for deriving a local oscillator beam from said source beam and directing said local oscillator beam to said polarization preserving fiber means;

said quarter wave means converting polarizations of said local oscillator beam and a return beam reflected from said target to cause said return beam and said local oscillator beam to have the same polarization;

said third lens means focusing said return beam and said local oscillator beam into said polarization preserving fiber means;

said polarization preserving fiber means transmitting said return beam and said local oscillator beam toward said second lens means;

said second lens means focusing said return beam and said local oscillator beam on said beam splitter means;

said beam splitter means directing said return beam and said local oscillator beam along a second optical axis;

fourth lens means, disposed on said optical axis, for focusing the return and local oscillator beams; and detector means for receiving and optical heterodyne detecting the focused return and local oscillators beams from said fourth lens means, and for providing an output signal corresponding to a distance between said local oscillator means and said target.

12. Apparatus according to claim 11 wherein said local oscillator means comprises on interface between ambient air and a target side of said quarter wave means.

13. Apparatus according to claim 11 where said polarization preserving fiber means has first and second transmission axes, said return beam being transmitted along said second axis.

14. Apparatus according to claim 11 where said beam splitter means splits a reference beam from said source beam, and further including reference arm means for (a) receiving said reference beam, (b) splitting off a further local oscillator beam from said reference beam, (c) directing said reference beam and said further local oscillator beam over respective first and second paths of different known lengths, (d) heterodyne mixing the reference and further local oscillator beams after they have travelled said paths, and (e) coherently detecting the mixed beams.

15. Apparatus according to claim 14 further including processing means coupled to said detector means and to said reference arm means, for calculating said distance between said target and said local oscillator means.

16. Apparatus according to claim 11 wherein said laser diode means provides a continuous wave source beam.

17. Optical distance measuring apparatus, comprising laser diode means for providing a continuous wave, single spatial mode source laser beam;

collimating lens means for collimating said source beam;

polarization dependent beam splitter means for directing said source beam along a first optical axis;

first focusing lens means, disposed on said first optical axis, for focusing the directed source beam;

polarization preserving fiber means, having first and second ends and first and second transmission axes, for receiving the focused source beam at said first end and transmitting it to said second end along said first axis preserving said single spatial mode;

second focusing lens means for receiving said source beam from said fiber second end and focusing it on a target;

quarter wave means for converting the spatial mode of said source beam emerging from said fiber means second end, an interface between ambient air and a target-side of said quarter wave means reflecting a local oscillator beam back toward said fiber second end, said quarter wave means also for converting a spatial mode of said local oscillator beam and a return beam reflected from said target, said interface heterodyning said return beam and said local oscillator beam to provide a mixed beam with one spatial mode;

said polarization preserving fiber means receiving said mixed beam at said second end and transmitting it to said first end along said second transmission axis preserving said one spatial mode; said first focusing lens means collimating the mixed beam emerging from said fiber first end and directing it toward said beam splitter means;

said beam splitter means receiving the collimated mixed beam and directing it along a second optical axis;

detector focusing lens means disposed along said second optical axis, for focusing the directed collimated mixed beam; and detector means for coherently detecting the focused, directed, collimated mixed beam, and for providing a detection signal corresponding to a distance between said interface and said target.

18. Apparatus according to claim 17 further including probe head means for supporting said fiber second end, said second focusing means, and said quarter wave means.

19. Apparatus according to claim 17 wherein said beam splitter means splits off a reference beam from said source beam and directs it to a reference channel, and further including reference channel means for receiving said reference beam, splitting off a further local oscillator beam from said reference beam, directing said reference beam and said further local oscillator beam over respective paths of different lengths, heterodyning said reference and further local oscillator beams to provide a further mixed beam, coherently detecting said further mixed beam, and providing a further detection signal corresponding to a difference in length of said respective paths.

20. Apparatus according to claim 19 further including processing means coupled to said detector means and said reference channel means for receiving said detection signal and said further detection signal, and for providing an output signal corresponding to a distance between said interface and said target.

* * * * *